United States Patent [19]

Röhrig et al.

[11] 4,260,355
[45] Apr. 7, 1981

[54] DEVICE FOR THE DISCONTINUOUS PRODUCTION OF BLOCK FOAM

[75] Inventors: Lothar Röhrig, Hennef; Gottfried Bücher, Troisdorf-Spich; Horst Klahre, St. Augustin, all of Fed. Rep. of Germany

[73] Assignee: Maschinenfabrik Hennecke GmbH, Leverkusen, Fed. Rep. of Germany

[21] Appl. No.: 108,993

[22] Filed: Jan. 2, 1980

[30] Foreign Application Priority Data

Jan. 13, 1979 [DE] Fed. Rep. of Germany ....... 2901176

[51] Int. Cl.³ .......................................... B29D 27/04
[52] U.S. Cl. .................................... 425/258; 264/51;
264/331.19; 422/133; 422/135; 422/228;
425/261; 425/448; 425/817 R; 521/917
[58] Field of Search ................................ 264/51, 54, 331;
521/917; 422/228, 135, 133; 425/258, 261, 448,
817 R

[56] References Cited
U.S. PATENT DOCUMENTS

| 2,649,620 | 8/1953 | Miller | 264/54 |
| 2,673,723 | 3/1954 | Keen | 521/917 X |
| 3,068,075 | 12/1962 | Bokemeier | 422/133 |
| 3,072,464 | 1/1963 | Akaboshi et al. | 422/228 |
| 3,385,671 | 5/1968 | Akelsson | 521/917 X |
| 3,771,770 | 11/1973 | Lehmann | 366/163 |

FOREIGN PATENT DOCUMENTS 224263 5/1959 Australia .................................. 521/917

Primary Examiner—Philip Anderson
Attorney, Agent, or Firm—Gene Harsh; Joseph C. Gil; R. Brent Olson

[57] ABSTRACT

The invention is directed to a device for the discontinuous production of block foam comprising a mixing unit, a means for moving the unit approximately vertically into and/or out of a mold with the unit having reaction component feed lines, a stirring means, and a mixing container having a plate with feed openings for the reaction components characterized in that (A) a distributing device is arranged below the feed opening for one of the components and
(B) the mixing container comprises a bottomless cylindrical shell, the lower rim of which can be placed on the bottom of the mold.

7 Claims, 9 Drawing Figures

1

DEVICE FOR THE DISCONTINUOUS PRODUCTION OF BLOCK FOAM

BACKGROUND OF THE INVENTION

The invention relates to a device for the discontinuous production of block foam wherein a bridge-like framework, is equipped with a vertically movable mixing unit, which is provided with component feed lines and a stirrer. The mixing unit has as a mixing container a bottomless cylindrical shell which can be mounted to a plate having feed openings for the reaction components. A distributing device is arranged underneath the feed opening for one of the reaction components. The mixing unit is vertically movable into and/or out of a mold placed beneath the mixing container. Equipment of this type is advantageous for the discontinuous production of block foam, when insufficient product requirements make continuous production unprofitable.

The mixing of the components is a particularly critical factor with equipment for discontinuous production techniques. With known equipment the components are simply introduced through a plate at the top of the mixing container and stirred. After each mixing operation, the interior wall of the mixing container has to be cleaned manually. A more refined version has a distribution channel at the upper edge of the mixing container, from the bottom of which an annular gap opens toward the interior wall of the mixing container. The mixing container is provided with a floor which has a lockable opening. In introducing the components through the feed openings into the mixing container, one component is fed in first through the distribution channel. This first component is distributed around the circumference of the interior wall of the mixing container and runs down the wall thereby rinsing it. Only then is the second component fed through the other feed opening, without using the distribution channel. Such a mixing container, therefore, is costly because of the necessary distribution channel and the container floor having a lockable exit opening. The flushing procedure is relatively time consuming, because the annular gap may not exceed a certain maximum width to assure the distribution of the components over the entire ring cavity of the distribution channel so that all wall sections are flushed uniformly. Flushing of the exit opening in the floor results in significant material losses.

It is an object of the invention to safely flush the interior walls of the mixing container within the shortest possible time, using relatively simple means. It is also an object of the invention to avoid flushing and to avoid additional areas which cannot be flushed and where the mixture could settle.

DESCRIPTION OF THE INVENTION

Figure 1:
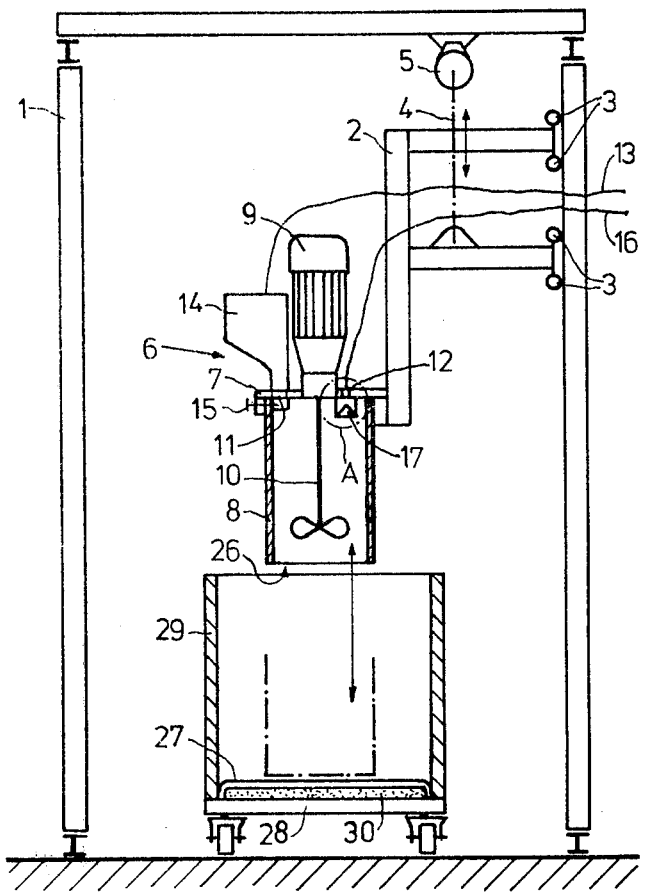
FIG. 1 shows a side view of the equipment partially in a cut.

The objects of the invention are accomplished by
(a) arranging a distributing device underneath the feed opening for one of the reaction components and
(b) designing the vertically movable mixing container as a bottomless cylindrical shell which can be placed with its lower rim on the bottom of a mold, preferably a box.

Arranging the distributing device underneath the feed opening for one of the reaction components permits the entering component, generally the polyol in polyurethane production, to be uniformly distributed over the upper area of the interior wall of the bottomless cylindrical shell, where it runs down the wall and flushes away any remaining mixture particles. The distributing device of the invention is considerably easier to manufacture than the distribution channels of known equipment. Furthermore, the distributing device is easily removed and replaced.

Using a bottomless cylindrical shell as a mixing container which can be placed with its lower rim on the bottom of a mold, eliminates the need for a lockable exit opening in the mold floor. Thus, the hard-to-clean seal areas of mold bottoms having lockable exit openings are eliminated.

In a preferred embodiment the distance of the distributing device from the feed opening can be adjusted. Adjusting the gap width between the feed opening and the distributing device permits control of the intensity of the spray, which is distributed umbrella-like in all directions. In a particularly preferred embodiment the feed opening is designed at an angle which corresponds to the surface contour of the distributing device.

The distributing device preferably is designed as a rotor. A rotor is particularly advantageous where the mixing container has a relatively large diameter and the component to be distributed has to be accelerated enough to sufficiently cover the interior wall of the mixing container. The distributing device may be designed as a plate, but is preferably designed as a cone, a half-sphere, or a paraboloid. It is understood that other similar shapes perform the same purposes and therefore fall within the scope of the invention.

In a preferred embodiment, the distributing device has a contour indented towards the shaft of the stirrer. The indented contour of the distributing device permits the flow of the components on the distributing device to be directed to (and to flush) that part of the interior wall which lies in the shadow of the stirrer shaft. In another embodiment the distributing device surrounds the stirrer shaft in a lateral direction either entirely or partially so that the stirrer shaft penetrates some parts of the surface of the distributing device. The type of contour depends on various factors, such as the outside diameter of the distributing device, the angle of the feed opening, the angle of the surface of the distributing device, and particularly the distance of the stirrer shaft from the distributing device.

In still another embodiment the distributing device has an asymmetric shape such as an asymmetric cone. An asymmetric shape is particularly advantageous when the feed opening is located quite off-center in the plate.

Embodiments of the invention are illustrated purely schematically in the drawings. FIG. 1 shows a support (2) with rollers (3), guided in a frame (1) and suspended on a line (4), which is equipped with a motor winch (5). A mixing unit (6) is mounted on the support (2). The mixing unit includes a plate (7) to which a mixing container (8) is attached, and a drive (9) for a stirrer shaft (10). Feed holes (11 and 12) for introducing the components into the mixing container are in the plate (7). The isocyanate component comes from a storage container through a metering pump (neither of which is shown) and a flexible line (13) to a temporary container (14), which is arranged at the plate (7). The exit of the temporary container (14), which when open is the feed opening (11) for the component into the mixing container (8), can be closed by a slide lock (15). The slide lock (15) has an opening diameter as large as possible so that the isocyanate can be introduced into the mixing container (8) very quickly when the slide lock (15) is opened. The polyol component comes from a storage container through a metering pump (neither of which is shown) and a flexible line (16) directly to the feed opening (12), under which a distributing device (17) is arranged. The distributing device shown in FIG. 2 comprises a rotating symmetrical cone (18) arranged on a threaded bolt (19). The bolt (19) is located in a nut (20), which is mounted from the bottom to the plate (7) with a holding device (21). The contour (22) of the feed opening (12) is adjusted to the angle of the distribution surface (23) of the cone (18), so that an adjustable gap (24) is formed at a defined width. The threaded bolt can be secured by a locking screw (25). As shown in FIG. 1 the mixing device (6) can be lowered by the support (2) until the lower edge (26) of the mixing container (8), designed as bottomless cylindrical shell, can be placed on a plastic film (27), which is spread over a flexible elastic layer (30) placed at the bottom (28) of a mold consisting of a rigid material and preferably a box mold (29).

The flexible elastic layer at the bottom of the mold is preferably from 0.1 to 5 cm thick with a thickness of from 0.3 to 1 cm being particularly preferred. The flexible elastic layer comprises a flexible foam mat, a flexible felt mat, a non-woven fabric, a foam rubber mat or the like. The plastic film is preferably composed of polyethylene, polypropylene or polyvinylchloride. The film is preferably from 0.05 to 2 mm thick and most preferably from 0.1 to 1 mm thick. In a preferred embodiment the plastic film has only slight adhesiveness so that the finished foam can be detached easily and the plastic film used again.

Figure 3:
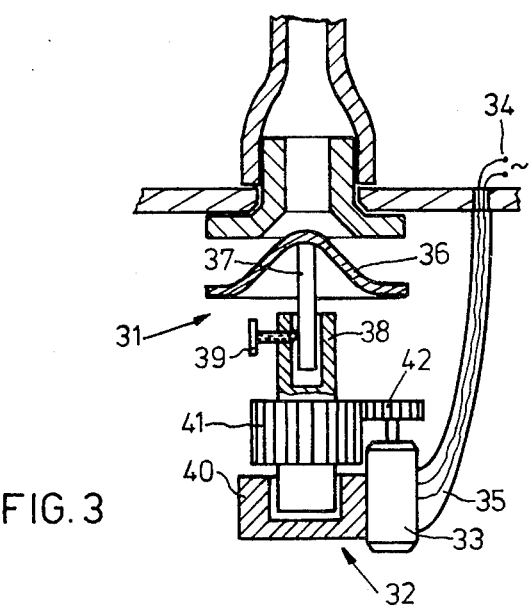
FIG. 3 shows a distributing device with rotation drive.

FIG. 3 shows the distributing device (31) equipped with a rotational drive (32). The rotational drive consists simply of an encapsuled electrical drive (33), whose lines (34) run through the hollow holding device (35) of the distributing device (31). The hood-shaped surface (36) of the distributing device (31) is rounded at the top and becomes more level toward the side. The distribution surface (36) is arranged on an axis (37), which is located inside a sleeve (38) and in which it can be secured by a locking screw (39). The sleeve (38) is secured in an end journal bearing (40) and is equipped with a toothed ring (41), which meshes with the pinion (42) of the rotational drive (32).

Figure 4:
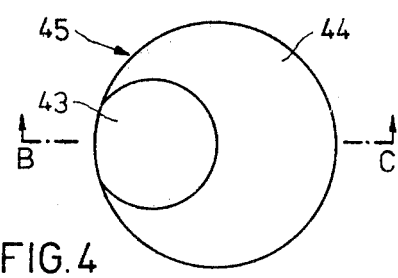
FIG. 4 shows the cone of a distributing device from the top with an indentation.
Figure 6:
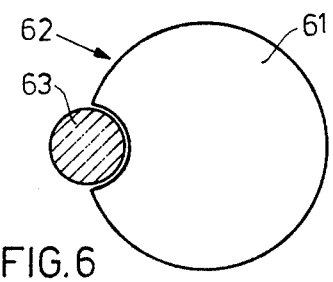
FIG. 6 shows a top view of the cone of a distributing device indented around the stirrer shaft.
Figure 5:
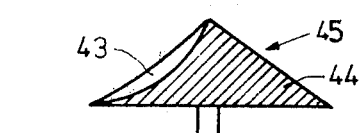
FIG. 5 shows a cut section along line B–C in FIG. 4.
Figure 7:
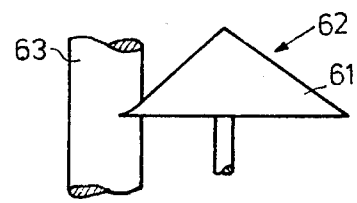
FIG. 7 shows a side view of the embodiment in FIG. 6.
Figure 8:
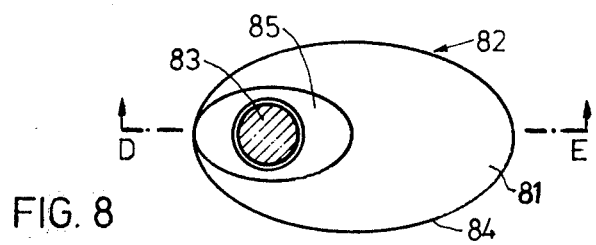
FIG. 8 shows the asymmetrical cone of a distributing device penetrated by the stirrer shaft.
Figure 9:
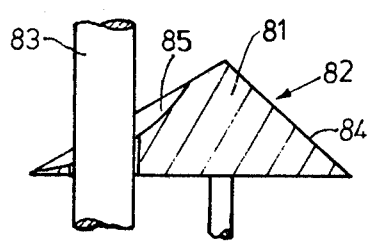
FIG. 9 shows the section according to line D–E in FIG. 8.

FIGS. 4 and 5 show the cone (44) of the distributing device (45) provided with an indentation (43) for improved flow control of the components to the interior wall which lies in the shadow of the stirrer shaft (not shown in the Figures). FIGS. 6 and 7 show the cone (61) of the distributing device (62) partially surrounding the stirrer shaft (63). In FIGS. 8 and 9, the asymmetrical cone (81) of the distributing device (82) surrounds the stirrer shaft (83). Furthermore, the surface (84) of the cone has indentations (85) for improved flow control.

Figure 2:
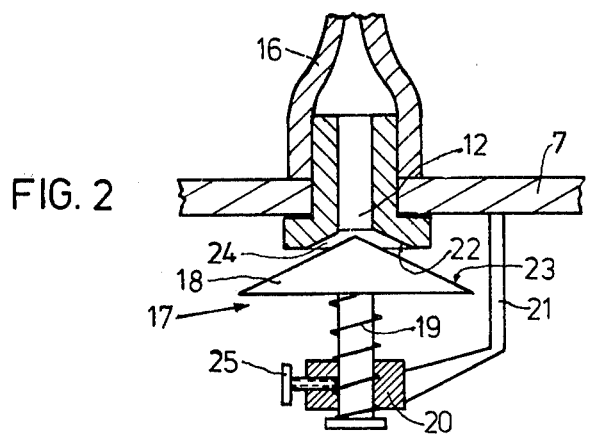
FIG. 2 shows the detail of A in FIG. 1 more explicitly.

The embodiment illustrated in FIGS. 1 and 2 operates as follows.

The equipment is operated discontinuously with several movable rigid molds, preferably box molds (28). After placing a box mold (28) under the mixing unit (6), the mixing unit is lowered by the motor winch (5) until the rim (26) of the mixing container (8) or open end of the cylindrical shell contacts the plastic film (27), whereby the flexible elastic layer (30) is depressed until the mixing container (8) is solidly placed. Then the polyol component is fed under pressure through the feed opening (12). The polyol thereby reaches the gap (24), which is formed by adjusting the bolt (19) between the surface (23) of the cone (18) of the distributing device (17) and the contour (22) of the feed opening (12). The distribution surface (23) deflects the polyol umbrella-like toward the upper section of the interior wall of the mixing container (8), from where the polyol runs down and flushes the interior wall. At the same time, the isocyanate component is transported through the feed line (13) into the temporary container (14). As soon as the entire amount of polyol component has been added, with activation of the stirrer shaft (10), the isocyanate is added essentially all at once by opening the slide lock (11). When mixing is completed, the mixing unit (6) is drawn upward, so that the reaction mixture spreads out in all directions within the box mold (29) and foams. The box mold (29) then is quickly replaced by another and the next cycle is begun.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A device for the discontinuous production of block foam comprising a mixing unit with a means for moving said unit approximately vertically into and/or out of a mold and with said mixing unit comprising reaction component feed lines, a stirring means, and a mixing container having a plate with feed openings for the reaction components characterized in that
   (A) a distributing device is arranged below a vertical opening for one of said components and the top of said distributing device is in substantially axial alignment with said vertical feed opening and
   (B) said mixing container comprises a bottomless cylindrical shell, the lower rim of which can be placed on the bottom of said mold.

2. A device as claimed in claim 1, characterized in that the distance of said distributing device from said feed opening for one of said components is adjustable.

3. A device as claimed in claim 1, characterized in that said distributing device comprises a rotor.

4. A device as claimed in claim 2, characterized in that said distributing device comprises a rotor.

5. A device as claimed in claim 1, characterized in that said distributing device is conical, semi-spherical, or paraboloidal.

6. A device as claimed in claim 3, characterized in that said distributing device is conical, semi-spherical, or paraboloidal.

7. A device as claimed in claim 1 or 6, characterized in that said stirring means comprises a stirrer having a shaft, and the surface of said distributing device has an indentation sloping towards said shaft of said stirrer.

* * * * *